United States Patent
Jost et al.

(10) Patent No.: US 9,434,332 B2
(45) Date of Patent: Sep. 6, 2016

(54) VEHICLE MANAGEMENT SYSTEM AND ASSOCIATED METHOD

(71) Applicant: RENAULT s.a.s., Boulogne-Billancourt (FR)

(72) Inventors: Jerome Jost, Le Perray en Yvelines (FR); Sann Ung, Ecquevilly (FR); Hoang-Giang Nguyen, Ris-Orangis (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/432,345

(22) PCT Filed: Sep. 24, 2013

(86) PCT No.: PCT/FR2013/052223
§ 371 (c)(1),
(2) Date: Jun. 29, 2015

(87) PCT Pub. No.: WO2014/053737
PCT Pub. Date: Apr. 10, 2014

(65) Prior Publication Data
US 2015/0307043 A1    Oct. 29, 2015

(30) Foreign Application Priority Data
Oct. 2, 2012  (FR) ..................... 12 59304

(51) Int. Cl.
*B60R 16/03*        (2006.01)
*B60R 16/037*        (2006.01)
(Continued)

(52) U.S. Cl.
CPC ............. *B60R 16/037* (2013.01); *B60K 35/00* (2013.01); *B60N 2/0244* (2013.01); *B60N 2/0248* (2013.01)

(58) Field of Classification Search
CPC . B60R 16/037; B60K 35/00; H04L 63/0428; H04L 9/3263; G06F 21/602; G06F 21/62
See application file for complete search history.

(56) References Cited

U.S. PATENT DOCUMENTS 6,853,988 B1 *   2/2005   Dickinson ............... G06F 21/32
                                                   380/277
8,280,583 B2 *   10/2012  Stahlin .................... H04L 67/12
                                                   180/168

(Continued)

FOREIGN PATENT DOCUMENTS

EP    2 228 270    9/2010
FR    2 893 883    6/2007

(Continued)

OTHER PUBLICATIONS

International Search Report Issued Jan. 8, 2014 in PCT/FR13/052223 Filed Sep. 24, 2013.

(Continued)

*Primary Examiner* — Thomas Tarcza
*Assistant Examiner* — Alex C Dunn
(74) *Attorney, Agent, or Firm* — Oblon, McClelland, Maier & Neustadt, L.L.P.

(57) ABSTRACT

A vehicle management system including a controller connected to at least one member of the vehicle by a network of the vehicle to exchange at least one item of information with the member, the management system including a symbol generator connected to the controller, the symbol generator issuing a symbol associated with the information held by the controller.

10 Claims, 3 Drawing Sheets

Figure 1:
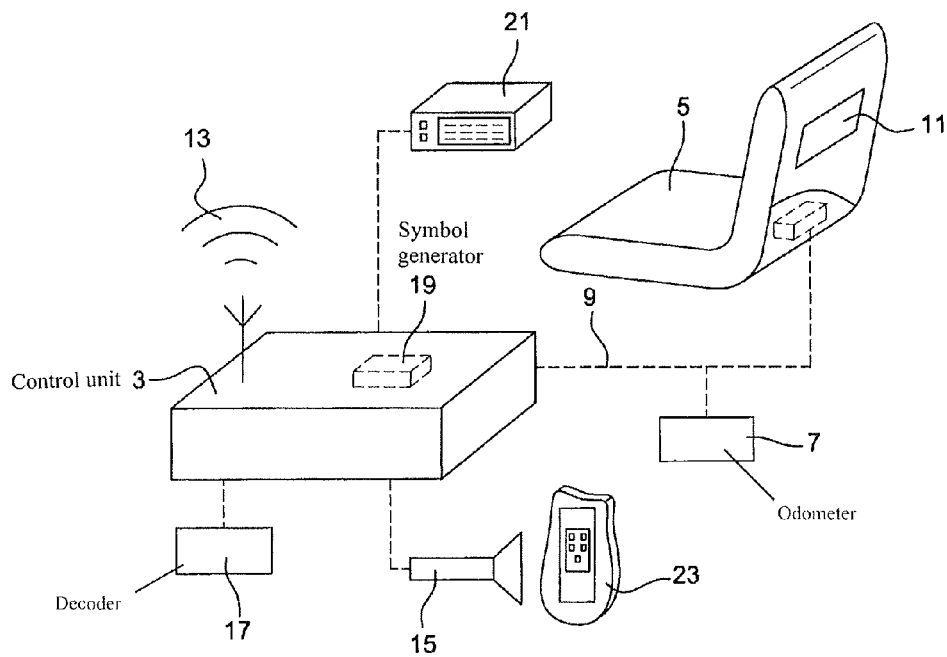

(51) Int. Cl.
    *B60N 2/02*    (2006.01)
    *B60K 35/00*   (2006.01)

(56) References Cited

U.S. PATENT DOCUMENTS

| 8,335,502 B2* | 12/2012 | Oesterling | H04W 4/046 |
| | | | 455/419 |
| 2002/0077985 A1* | 6/2002 | Kobata | G06F 21/10 |
| | | | 705/51 |
| 2003/0218532 A1 | 11/2003 | Hussmann | |
| 2006/0038447 A1 | 2/2006 | Bruelle-Drews | |
| 2007/0112492 A1 | 5/2007 | Hyodo et al. | |
| 2007/0173993 A1* | 7/2007 | Nielsen | G07C 5/085 |
| | | | 701/33.4 |
| 2008/0024296 A1* | 1/2008 | Jeong | B60R 16/037 |
| | | | 340/539.26 |
| 2009/0287369 A1* | 11/2009 | Nielsen | G06Q 30/00 |
| | | | 701/31.4 |
| 2010/0222939 A1* | 9/2010 | Namburu | G07C 9/00111 |
| | | | 701/2 |
| 2010/0228405 A1* | 9/2010 | Morgal | B62H 3/02 |
| | | | 701/2 |
| 2010/0233957 A1 | 9/2010 | Dobosz | |
| 2011/0112969 A1* | 5/2011 | Zaid | G06Q 10/02 |
| | | | 705/50 |
| 2011/0244919 A1* | 10/2011 | Aller | G06K 9/00973 |
| | | | 455/556.1 |
| 2011/0257973 A1* | 10/2011 | Chutorash | G01C 21/3661 |
| | | | 704/235 |
| 2012/0086249 A1* | 4/2012 | Hotary | B60N 2/0228 |
| | | | 297/284.3 |
| 2012/0198241 A1* | 8/2012 | O'Hare | G06F 21/602 |
| | | | 713/189 |
| 2013/0133086 A1 | 5/2013 | Liberman et al. | |

FOREIGN PATENT DOCUMENTS

| FR | 2 954 922 | 7/2011 |
| WO | 2004 074047 | 9/2004 |
| WO | 2011 138558 | 11/2011 |

OTHER PUBLICATIONS

French Search Report Issued Jun. 11, 2013 in Application No. FR 1259304 Filed Oct. 2, 2012.

* cited by examiner

VEHICLE MANAGEMENT SYSTEM AND ASSOCIATED METHOD

The invention relates to a management system for a vehicle and an associated method. More particularly, the invention relates to a system for managing at least one vehicle component by encoding and decoding at least one symbol, as well as the associated method. The management of the vehicle applies to the management of various user profiles of the vehicle but also to the management of vehicle data.

Vehicle access key devices exist for associating the settings of various components of the vehicle with a user profile according to the key used to unlock the vehicle, the values of the parameters being recorded in a storage means located in the vehicle. These access key devices can include a transponder integrated in the key on which certain information specific to the vehicle is recorded, which information can be read on a dedicated apparatus.

This system is not satisfactory since the user profile is associated with a key of a vehicle. In addition, the recording of vehicle-specific information requires management of the memory in the transponder.

The document FR-A1-2954922 discloses a management system for a public transport vehicle including a control unit connected to a seat of the vehicle via the onboard network of said vehicle and to an optical barcode reader transmitting the barcode to a decoding means, the control unit commanding the component of the vehicle according to the information associated with the barcode.

The drawback of this document is that it does not provide for recording the information, whether this be information related to the user or to the vehicle.

The invention aims to remedy these drawbacks by proposing a management system for a vehicle including a control unit connected to at least one component of the vehicle via a network of said vehicle in order to exchange at least one item of information with said component. The management system comprises a symbol generator connected to the control unit and which issues a symbol associated with said information held by the control unit.

The invention can include the following technical features, taken in isolation or in combination:
- the symbol can be interpreted by a decoding means,
- the information includes at least one value of said component of the vehicle,
- the system includes a man-machine interface connected to the control unit and the control unit commands the display of at least one message on the man-machine interface, which message is formulated to determine whether a user wishes to generate a new symbol,
- the symbol is generated according to values supplied by the user,
- the symbol generator is displaced from the vehicle.

The invention also relates to a management method for a vehicle including a control unit connected to at least one component of the vehicle via a network of said vehicle. Said method includes the following steps:
- a step for the exchange of at least one item of information between the control unit and said component,
- a step for the acquisition of the information by the control unit,
- a step for the generation of at least one symbol associated with said information acquired by the control unit.

According to a variant, the method can include:
- a step for detecting events recorded in the control unit, including:
  - a sub-step for placing the detected event in correspondence with a list of components, the information of which is intended to be encoded.

According to a particular embodiment, the method can include a step for displaying, on a man-machine interface, at least one message aiming to ask the user whether he/she wishes to generate a symbol.

According to a further aspect, the method can include a step for acquiring the response of the user to the display step.

Figure 2:
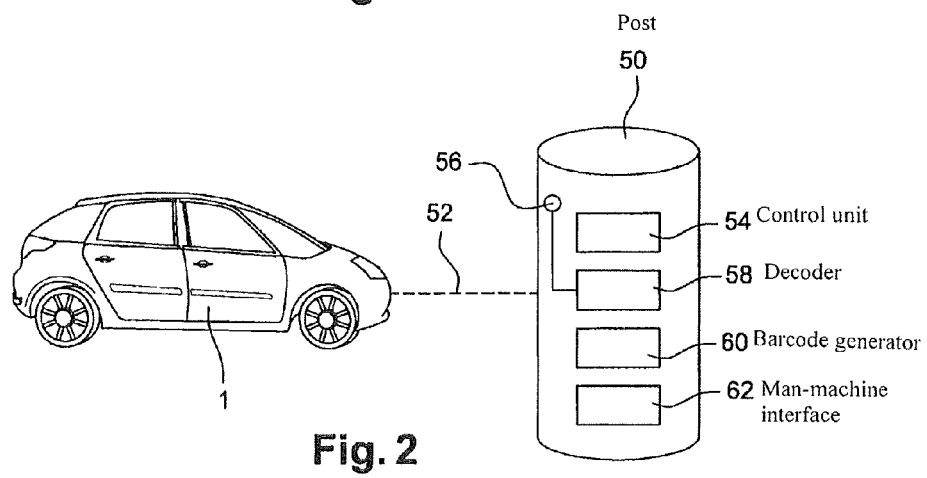
Figure 3:
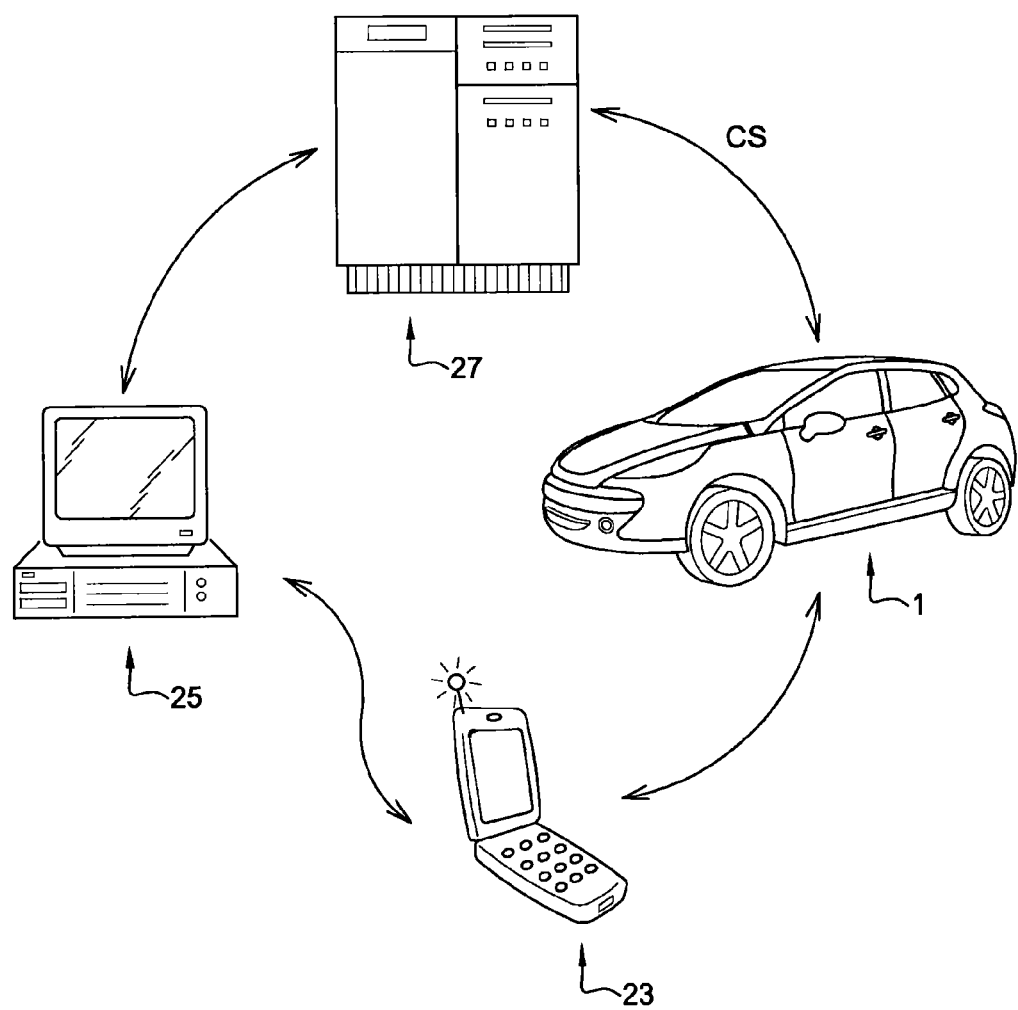
Figure 4:
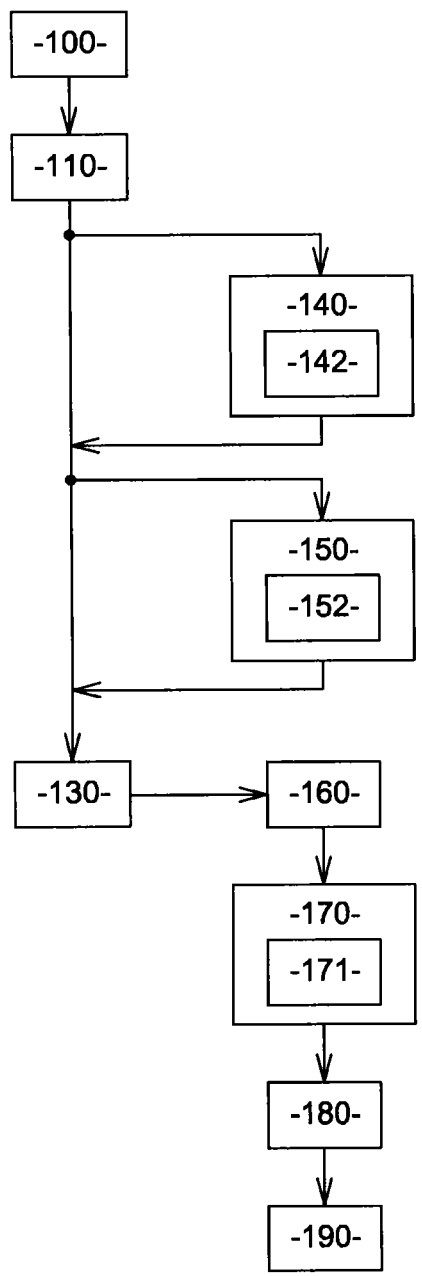

Other features and advantages of the invention will become clear upon reading the following detailed description, given by way of non-limiting example. In order to understand it, reference will be made to the appended drawings in which:

FIG. 1 is a schematic representation of a main embodiment of a management system, FIG. 2 is a schematic representation of an implementation of the system including secure and non-secure data, FIG. 3 is a schematic representation of a particular embodiment of the system, and FIG. 4 is a schematic representation of a management method for a vehicle.

An embodiment of the invention is represented in FIG. 1 in which a management system for a vehicle 1 (reference in FIGS. 2 and 3) includes a control unit 3. The control unit 3 is connected to a seat 5 and to an odometer 7 of the vehicle via the internal network 9 of the vehicle of the CAN (Controller Area Network) network type, and is also connected to a screen 11 integrated in the back of the seat 5 via a wireless network 13 of the Wi-Fi or Bluetooth network type.

In addition, the control unit 3 is connected to an optical symbol reader 15, for example a camera 15 located in the passenger compartment of the vehicle. In a particularly advantageous manner, the camera 15 can be a camera for monitoring driver vigilance, or any other camera already present in the passenger compartment of the vehicle 1. Thus it is possible to limit the integration of new means in the vehicle and reduce the costs of implementing the invention.

The symbols comprise any graphical representation that can be read by an image acquisition means, such as for example and in a non-limiting manner a 1D barcode of the variable length Code 128, Code 93 type, a 2D barcode or QR Code (Quick Response Code), a 2D or 3D hologram, an item of text, an image, Braille characters, etc. The symbols can also comprise audible signals that can be read by an audible acquisition means, for example a microphone.

By way of known example, a Code 93 type barcode provides for containing 44 alphanumeric characters. A Code 128 type barcode provides for containing 128 characters. A two-dimensional barcode of the QR-Code type, version 40 having a resolution of 177×177 pixels, can contain web address data and text data up to 4296 alphanumeric characters.

The type of barcode chosen to implement the invention is conditional upon the quantity of information required to implement the invention. In the context of the example illustrated, a barcode of the QR type, version 10 (57×57 pixels for 395 alphanumeric characters), has been chosen.

In the main embodiment, the camera 15 transmits a barcode to a decoding means 17 connected to the control unit 3. The decoding means 17 includes at least one algorithm able to decode the barcode, i.e. to retranscribe the various points of the barcode into binary data. For example, a 1D barcode of the Code 93 type provides for transmitting data on 64 bits, and a QR Code provides for transmitting data on 256 bits.

The decoding means 17 transmits the information contained in the barcode to the control unit 3 which commands the seat 5 and the screen 11 according to the information contained in the barcode. For example, in the embodiment presented, this information is the adjustment of the seat 5 according to data which corresponds to the preferences of a user, the heating of the seat 5 and the display of the itinerary on the screen 11.

The management system comprises a symbol generator 19, for example a barcode generator 19, connected to the control unit 3. The barcode generator 19 encodes information into barcode form; in other words the generator 19 transcribes the data associated with the information into a barcode.

In the embodiment represented in FIG. 1, the generator 19 is implemented directly in the control unit 3, but other variants are possible, and another example will be given later in the description. The generator 19 issues a barcode according to values of the parameter or parameters of the component which are held by the control unit 3, for example the values of the adjustment parameters for the seat 5 and the display screen 11.

In the embodiment presented, the barcode thus generated can be displayed on a man-machine interface 21, also called MMI 21, located in the central console of the instrument panel (not represented), this with the aim of the user acquiring the barcode, for example with the aid of a smartphone 23, a tablet or any other mobile device equipped with a photographic camera. In a particularly advantageous manner, the MMI 21 will also be able to be integrated in an existing screen of the vehicle such as the navigation screen or the instrument panel.

The control unit 3 can also command the display of messages on the MMI 21 which are formulated to determine whether the user wishes to generate a new barcode. The control unit 3 can thus command the display of a message of the type: "Do you want to issue a new barcode for the last set of modifications?"; if the user responds affirmatively then the control unit 3 sends a command to the barcode generator 19 in order that it issues a barcode incorporating the new data. Otherwise, the control unit 3 commands the display of a predefined list of components of the vehicle in order to determine which information the user wishes to record in barcode form, or a display in which the user adjusts the values him-/herself, for example stopping the heating of the seat 5. In all these cases, the control unit commands the barcode generator 19 to issue bars incorporating the various items of information supplied by the user.

According to a particular aspect of the invention represented in FIG. 1, the control unit 3 is connected to the odometer 7 of the vehicle 1. Thus it is possible to generate a barcode containing information on the number of kilometers of the vehicle 1, through the barcode generator 19. In this way, it is possible to generate one or many barcodes including information specific to the vehicle 1 with a view to a diagnostics or maintenance of the vehicle 1, by sending the barcode or barcodes by messaging or by e-mail from the smartphone 23. By way of illustration, not represented, information concerning diagnostic trouble codes (DTCs), states and parameters of the various computers can also be transmitted by this means.

The link from the control unit 3 to the CAN network of the vehicle is particularly advantageous since the control unit 3 has access to all the vehicle data which is connected to the CAN network. The control unit 3 can thus perform the acquisition of this data with a view to transmitting it to the barcode generator 19 for encoding and displaying the barcode intended for the user.

In a particular embodiment of the invention, represented in FIG. 2, the user can adjust the values of various components of the vehicle from a computer 25 by logging in or by sending the various values of the parameters of the component to a remote server 27. The remote server 27 is able to encode the information in barcode form and return the barcode thus generated to the computer 25. The user will be able to transfer the barcode to his/her smartphone 23 in order to be to able to use it later. For example, the user can program his/her next itinerary and the itinerary preferences, for the next use of the vehicle 1, which is advantageous since the user will no longer have to enter destination data once the barcode is presented to the camera 15.

In a first variant, not represented, the user adjusts the values from his/her smartphone 23 connected to the remote server 27 and receives the associated barcode, in the same way as in the example described previously.

In a second variant, not represented, the smartphone 23 includes an application which contains a generator of barcode type symbols providing for generating a barcode from information supplied in the application.

According to a particular embodiment represented in FIG. 2, users can purchase services in the same way as they adjust their preferences, i.e. from their computer 25 or their smartphone 23. As far as secure purchases are concerned, these require an encrypted data exchange for obvious reasons of security. The encryption techniques are known to the person skilled in the art, for example symmetric encryption or asymmetric encryption.

Services can be of different kinds, such as for example hotel reservations, toll charges for a future itinerary, a GPS card, the purchase of a music album, etc.

Associating an online service purchase with a symbol exhibits the advantage of dematerializing the medium in which the service is implemented. Thus, a user purchases only once a GPS card for Europe, for example, and will have the possibility of finding the GPS card for Europe in all the vehicles equipped with the management system as presented.

According to another embodiment, represented in FIG. 3, the components of the management system are displaced from the vehicle 1 into a post 50 connected to the vehicle 1 via a wired network 52 or Wi-Fi. The post 50 includes a control unit 54, a camera 56, a decoding means 58, a barcode generator 60 and the MMI 62. These components are similar to those presented previously; the references have been changed in order to clearly illustrate that the system can include all or some of these components fitted onboard or in a remote manner according to the need.

This variant is advantageous in the event of an application of the invention to a car-sharing system. The user can reserve and pay for his/her vehicle from his/her smartphone 23 and present the barcode to the camera 15 of the post 50 at the time of hire of the vehicle 1, and perform the acquisition of a symbol associated with the costs of use of the vehicle at the end of the hire.

According to another embodiment, not represented, the decoding means 17 can be implemented in the computer of the camera and the generator 19 can be implemented in the MMI 21.

Another subject of the invention is a management method for the vehicle 1 including the device described above. As represented in FIG. 4, this method includes the following steps:

a step 100 for the exchange of information between the control unit 3 and one of the components of the vehicle, for example the adjustment values for the seat 5, a step 110 for the acquisition of information by the control unit 3, a step 130 for the generation, by the barcode generator 19, of said barcode associated with said information acquired by the control unit 3.

As represented in FIG. 4, the method can include a step 140 for detecting events recorded in the control unit 3, such as for example the detection of the stopping of the engine and the opening of a door. Step 140 includes a sub-step 142 for correspondence between the detected event and a list of components, the information of which is intended to be encoded.

Step 140 provides for associating an event with the command for acquiring the value of certain components of the vehicle. Another example application is to detect the combination of the stopping of the engine and the activation of the hazard warning lights in order to command the acquisition of values specific to the vehicle, such as number of kilometers of the vehicle, the tire pressure values and the fuel level, with the aim of being able to command the generation of a barcode containing all the information, automatically and rapidly, in order that the user can transmit it to a garage or any other body able to perform a diagnosis.

The method can also include a step 150 for commanding the display, on the MMI 21 commanded by the control unit 3, of messages aiming to ask the user whether he/she wishes to generate a barcode. Still according to this embodiment, the method includes a step 152 for the acquisition of the response to step 150; if the response to step 150 is affirmative, step 130 for generating a barcode is implemented.

The barcode thus generated can be interpreted by the decoding means 17 connected to the control unit 3 and to a camera 15 according to the steps below:

a step 160 for the reading of the barcode by the camera 15, a step 170 for transmitting the barcode to the decoding means 17, a step 171 for the decoding of the barcode by the decoding means 17; this step provides for determining the information associated with the barcode, a step 180 for transmitting the information associated with the barcode to the control unit 3, a step 190 for commanding components of the vehicle according to the information associated with the barcode.

The invention is not limited to the embodiments presented above; the invention can be applied to any component once that component is connected to a network linked to the control unit 3.

The control unit may be a specific component of the vehicle or may be functionally integrated with a component of the vehicle providing another function (for example the BCM (Body Control Module)).

The invention claimed is:

1. A management system for a vehicle including controller circuitry connected to at least one component of the vehicle via a network of the vehicle to exchange at least one item of setting information with the component, the system comprising:
   symbol generation circuitry connected to the controller circuitry,
   wherein the symbol generation circuitry issues a camera readable symbol representing the setting information held by the controller circuitry, and
   wherein the at least one component of the vehicle is configured based the at least one item of setting information visually read from the camera readable symbol issued by the symbol generation circuitry.

2. The management system as claimed in claim 1, wherein the camera readable symbol is interpretable by decoding circuitry.

3. The management system as claimed in claim 2, wherein the setting information includes at least one operational value of the component of the vehicle.

4. The management system as claimed in claim 1, further comprising a man-machine interface connected to the controller circuitry, and wherein the controller circuitry is further configured to command display of at least one message on the man-machine interface, which message is formulated to determine whether a user wishes to generate a new camera readable symbol.

5. The management system as claimed in claim 4, wherein the camera readable symbol is generated according to values supplied by the user.

6. The management system as claimed in claim 1, wherein the symbol generation circuitry is external to the vehicle.

7. A management method for a vehicle including a controller circuitry connected to at least one component of the vehicle via a network of the vehicle, the method. comprising:
   exchanging at least one item of setting information between the controller circuitry and the component;
   acquiring the setting information by the controller circuitry; and
   generating at least one camera readable symbol representing the setting information acquired by the controller circuitry,
   wherein the at least one component of the vehicle is configured based the at least one item of setting information visually read from the generated camera readable symbol.

8. The management method as claimed in claim 7, further comprising:
   detecting events recorded in the controller circuitry, including:
      placing the detected event in correspondence with a list of components, information of which is intended to be encoded.

9. The management method as claimed in claim 7, further comprising displaying, on a man-machine interface, at least one message asking a user whether he/she wishes to generate a camera readable symbol.

10. The management method as claimed in claim 9, further comprising acquiring a response of the user to the display.

* * * * *